US008480014B2

(12) United States Patent
Gruendl et al.

(10) Patent No.: US 8,480,014 B2
(45) Date of Patent: Jul. 9, 2013

(54) FLUID INJECTION VALVE

(75) Inventors: Andreas Gruendl, Starnberg (DE); Bernhard Hoffmann, Starnberg (DE); Friedrich Mörtl, Starnberg (DE)

(73) Assignee: Compact Dynamics GmbH, Starnberg (DE)

( * ) Notice: Subject to any disclaimer, the term of this patent is extended or adjusted under 35 U.S.C. 154(b) by 883 days.

(21) Appl. No.: 12/527,988

(22) PCT Filed: Dec. 6, 2007

(86) PCT No.: PCT/EP2007/010617

§ 371 (c)(1), (2), (4) Date: Dec. 7, 2009

(87) PCT Pub. No.: WO2008/101535

PCT Pub. Date: Aug. 28, 2008

(65) Prior Publication Data

US 2010/0140380 A1 Jun. 10, 2010

(30) Foreign Application Priority Data

Feb. 23, 2007 (DE) ......................... 10 2007 008 901

(51) Int. Cl.

| | |
|---|---|
| ***B05B 1/30*** | (2006.01) |
| ***F02M 51/00*** | (2006.01) |
| ***F16K 31/02*** | (2006.01) |
| ***F16K 31/00*** | (2006.01) |

(52) U.S. Cl.
USPC ..................... 239/585.3; 239/584; 239/585.1; 239/585.4; 251/129.06; 251/335.2; 251/335.3

(58) Field of Classification Search
USPC .... 239/584, 585.1, 585.3, 585.4; 251/129.06, 251/335.2, 335.3
See application file for complete search history.

(56) References Cited

U.S. PATENT DOCUMENTS

| | | | | |
|---|---|---|---|---|
| 6,311,950 | B1 * | 11/2001 | Kappel et al. | 251/129.06 |
| 6,435,430 | B1 * | 8/2002 | Ruehle et al. | 239/585.4 |
| 2005/0103587 | A1 * | 5/2005 | Fischer et al. | 188/297 |

FOREIGN PATENT DOCUMENTS

| | | | |
|---|---|---|---|
| DE | 40 05 455 | A1 | 8/1990 |
| EP | 1 046 809 | | 10/2000 |
| FR | 2 443 587 | A | 7/1980 |
| WO | WO 03/012282 | A | 2/2003 |

OTHER PUBLICATIONS

International Search Report for corresponding PCT/EP2007/010617 completed Apr. 1, 2008 by Erik Torle of the EPO.

* cited by examiner

*Primary Examiner* — Ryan Reis

(57) ABSTRACT

A fluid injection valve having an inlet which is set up to receive fluid from a supply line and is connected to a chamber, a fluid outlet which is connected to the chamber, is set up to allow fluid to flow out of the fluid injection valve and has a valve arrangement having a valve seat and a valve element, wherein the valve element is set up to perform opening and closing movements relative to the valve seat, a linear actuator which is set up to move the valve element relative to the valve seat, and a spring arrangement which exerts on the valve element a force which is dependent on the fluid pressure prevailing in the chamber.

14 Claims, 4 Drawing Sheets

M
12
10
60
20
62
18
14
30
26a
26
32
24
24b
44
22
24a
34
50
38
36
52
48
46
Stroke Fig. 2a
Fig. 2b
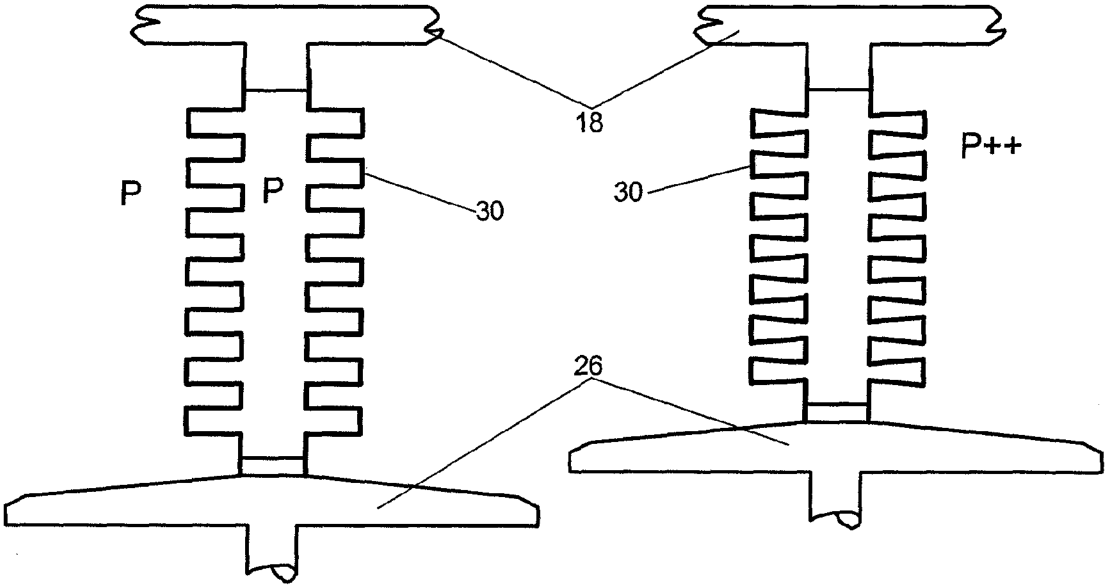
Fig. 3a
Fig. 3b
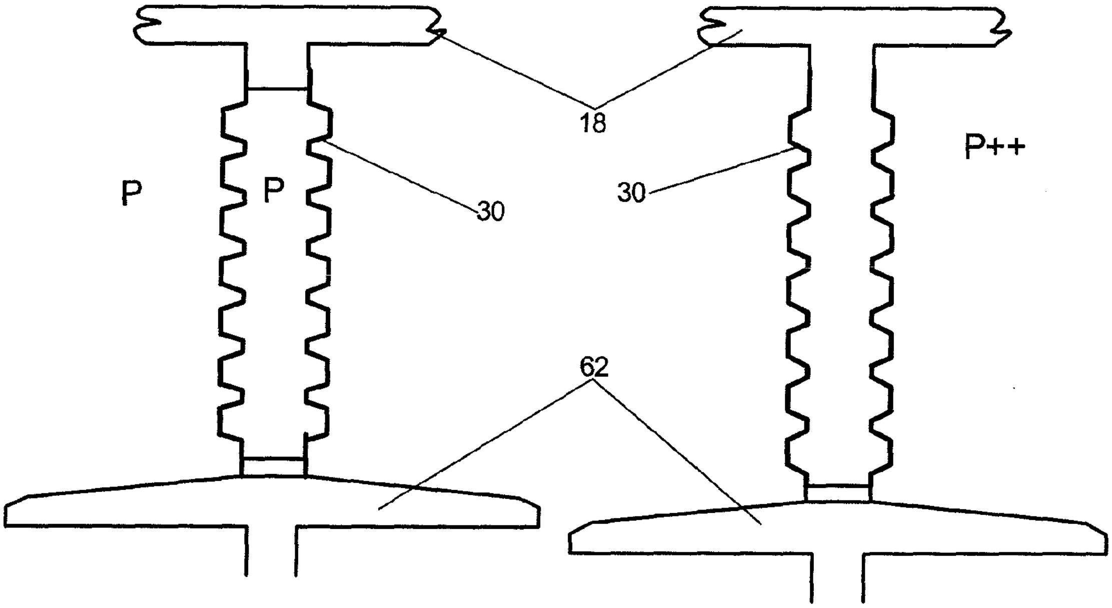

FLUID INJECTION VALVE

FIELD

In the text below, in general a fluid injection valve is described, for example for directly injecting fuel into a combustion chamber of an internal combustion engine. In principle, it is possible to use the invention both in direct injection engines and in conventional engines that inject into the intake manifold. However, the field in which the invention is applied is not restricted to fuel injection systems. The invention may also be used in other areas of application in which the precisely controlled and/or metered introduction of fluid into a chamber, a region of use or a working chamber is required or desirable.

The fluid injection valve will be described here in conjunction with the injection of fuel into a combustion chamber of an internal combustion engine.

The ever greater demands of legislation relating to exhaust gas and the repeated reduction of limit values present the challenge of optimising the procedure of injecting fuel into the combustion chamber and hence optimising the occurrence of pollutants at the point of this occurrence. Critical emissions are in particular $CO_2$, $NO_x$ and carbon particles. By developing injection systems which operate at higher and higher injection pressures with highly dynamic injectors, and as a result of cooled exhaust gas recycling and oxidation catalysts, it is possible to observe current limit values; but the potential for these known measures to reduce emissions seems to have been reached.

PRIOR ART

In the prior art, so-called common rail systems are known, also called accumulator injection systems. In the common rail system, the generation of pressure and the injection of fuel are completely independent of one another. A separate high-pressure pump continuously generates pressure in the fuel supply line for all the injection valves of an internal combustion engine. This allows the fuel pressure to be built up independently of the injection sequence, making it permanently available in the fuel line. However, fluctuations in pressure arise here which have an effect on the quantity of fuel injected into the combustion chamber. The high pressure which is constantly present, of more than 1350 bar, is stored in the so-called rail (=line) and made available to the fast-acting solenoid valves (injectors) of a cylinder row of the internal combustion engine, through short injection lines. The moment of injection and the quantity of fuel are calculated individually for each cylinder and injected by way of the injectors.

The pressure of fuel in the rail is conventionally metered by a pressure regulating valve and monitored by a rail pressure sensor. This makes the equipment highly complex, which means common rail systems of this kind are very expensive.

For "clean" combustion of fuel in internal combustion engines, and indeed when it used for other purposes, it is important to meter the fluid—for example the fuel—particularly precisely and also to dispense variable quantities in a manner which is precisely reproducible over a plurality of injection cycles. With known injection systems, however, it is possible only with difficulty to control the accuracy of metering using the dynamics required for example of a fast-running internal combustion engine.

In particular in the case of inwardly opening valves, there is moreover the following problem: when the valve is closed, because of the high pressure in the valve housing (2000 to 2500 bar and above), very high closing or holding forces act on the valve element that is seated on the valve seat. These forces are determined by the product of the pressure in the valve housing and the valve cross-section. These forces must be overcome by a controlled actuator when the valve is opened. For this reason, the actuator (which operates for example electromagnetically or piezo-electrically) must be of a correspondingly powerful construction. Thus, conventional electromagnetic or piezo-electrical actuators are of relatively large construction and require considerable electrical power. Furthermore, the electronic control circuit that drives them and the control lines also have to made correspondingly large (from an electrical and mechanical point of view).

Studies have been carried out (by Fiat) for a fluid injection valve for injecting fuel, having a piston which is coupled to the valve element and generates a force in opposition to the closing force. In this case, the piston is dimensioned such that it relieves the valve element as a function of the pressure in the interior of the valve housing, in such a way that the valve element is acted upon by approximately the same low closing force at all times. When the valve is opened, the piston releases an unpressurised fuel return line to the fuel tank. This piston and a bushing surrounding it must in this case be manufactured with great precision; moreover, they are subject to more than negligible wear over the lifetime of the fluid injection valve. The unpressurised return line for fuel that is required in this case represents considerable complexity in terms of space occupied and manufacture.

OBJECT OF THE INVENTION

The object arising from this is to obviate, at least in part, the disadvantages of the known systems mentioned above.

STATEMENT OF INVENTION

This object is achieved by a fluid injection valve having the features of claim 1. A fluid injection valve of this kind has an inlet which is set up to receive fluid from a supply line and is connected to a chamber, a fluid outlet which is connected to the chamber, is set up to allow fluid to flow out of the fluid injection valve and has a valve arrangement having a valve seat and a valve element, wherein the valve element is set up to perform opening and closing movements relative to the valve seat, a linear actuator which is set up to move the valve element relative to the valve seat, and a spring arrangement which exerts on the valve element a force which is dependent on the fluid pressure prevailing in the chamber.

This arrangement is able to compensate at least in part for uncontrolled fluctuations in pressure in the fluid supply, for example the pulsing of a feed pump that feeds the fluid injection valve. This makes it possible to improve the metering behaviour of the fluid injection valve. In the case of fuel injection systems in internal combustion engines, this helps to reduce the fuel consumption and to reduce exhaust gases ($CO_2$, $NO_x$, carbon particles, etc.). The invention makes use, in a surprisingly advantageous way, of the fact that it is possible using the fluid injection valve according to the invention, in which a spring arrangement exerts on the valve element a force which is dependent on the fluid pressure prevailing in the chamber, not only to control better the opening time and the opening stroke of the valve element relative to the valve seat but also the velocity profile of the opening stroke. This is because the fluctuations in pressure of the supplied fluid are at least in part eliminated, with the result that the influence thereof on the valve element is eliminated. This makes it possible to control actuation of the valve even more precisely than is in any case achieved with known arrangements. The associated saving on fuel—and consequently also the reduction in exhaust gases—may amount to a few percentage points.

This considerable saving is also the result of the fact that the actuators of known injectors must be set up to compensate for these fluctuations in pressure; that is to say that they must apply the required closing and actuation forces even when the fluid pressure conditions in the chamber of the fluid injection valve are unfavourable. If these fluctuations in pressure are at least in part compensated, then—with the same size of construction and the same performance data—it is possible for actuation of the fluid injection valve to be more dynamic or, conversely, fluid injection valves of smaller construction but with comparable performance data can also be provided. Moreover, movement of the valve element relative to the valve seat can be controlled better, with the result that for example a considerably "softer landing" of the valve element in the valve seat is made possible than with known arrangements. This lengthens the service life of the fluid injection valve. Moreover, this provides more freedom for the form of the valve geometry, since the load on the valve element and the valve seat is reduced. This allows the geometry to be oriented to the optimum behaviour of injecting fuel into the combustion chamber. With a larger valve seat diameter (because there is less load on the material of the valve seat in the closed condition), the stroke of the valve element relative to the valve seat can be reduced. Thus, the injection time can be significantly reduced—with the same volumetric flow of fluid. This makes very efficient multiple injections possible on each work cycle. This is attributable to the fact that the force of holding closed increases in squared proportion to the linearly increasing diameter of the valve seat, while the stroke of the valve element decreases linearly, with the same volumetric flow of fluid. Consequently, the material tension at the point of sealing increases linearly, and the result is that the load on the material at the point of sealing is the limiting factor.

FURTHER DEVELOPMENTS AND EMBODIMENTS

In an embodiment, the spring arrangement is formed and dimensioned such that it exerts a force on the valve element that is inversely proportional to the fluid pressure prevailing in the chamber. In this way—in a configuration as a pressure spring—when the fluid pressure prevailing in the chamber is high, a low force acts on the valve element, and when the fluid pressure prevailing in the chamber is low, a high force acts on the valve element. In a configuration as a tensile spring, the arrangement is to be selected such that when the fluid pressure prevailing in the chamber is low, a high force acts on the valve element, and when the fluid pressure prevailing in the chamber is high, a low force acts on the valve element.

In the fluid injection valve, the spring arrangement can exert a force which acts on the valve element in the direction of closing the valve arrangement if the valve element moves outwards on opening—in relation to the chamber—or acts on the valve element in the direction of opening the valve arrangement if the valve element moves inwards on opening—in relation to the chamber. This means that the force to be applied by the linear actuator to keep the fluid injection valve closed (with an outwardly opening variant) or to open it (with an inwardly opening variant) is reduced.

In an embodiment, the spring arrangement has a rest condition with a pre-tension, wherein the pre-tension exerts on the valve element approximately one quarter to three quarters (preferably approximately half) of the force which the fluid pumped into the chamber exerts.

As an embodiment, the spring arrangement is formed by a bellows arrangement whereof the force exerted on the valve element varies with the pressure of the fluid prevailing in the chamber. The form of the bellows, which is preferably made of high-grade austenitic steel, is in this case selected such that in addition to the change in volume caused by the fluid pressure, it also acts as a (pre-tensioned) tensile or pressure spring between the immovable housing of the fluid injection valve and the valve element which is movable relative thereto.

For this purpose, the bellows arrangement may have a form which is substantially cylindrical (in the manner of a circle) or indeed (double) conical, wherein the spring arrangement is either formed and dimensioned such that it becomes longer as the fluid pressure increases or becomes shorter as the fluid pressure increases.

The spring arrangement may also include a push-pull plate which is substantially dish-shaped and is oriented—relative to the direction of movement of the valve element—in the radial direction, and at least one chamber which is deformable under pressure and is arranged fluid-tight against the dish-shaped push-pull plate such that it deforms the push-pull plate elastically under the action of pressure prevailing in the chamber, with the result that the force thereof exerted on the valve element varies with the pressure of the fluid prevailing in the chamber.

The spring arrangement may have a cylindrical or conical annular portion, which rests on a stator, and a planar disc portion, which may have a central cutout receiving a pin of the armature or rotor.

A concentrically corrugated sheet-metal moulding may be arranged fluid-tight on the side of the spring arrangement facing the stator, such that the sheet-metal moulding and the push-pull plate form a pressurised chamber which is deformable under pressure.

The concentrically corrugated sheet-metal moulding may be connected by its edges to the push-pull plate and the annular portion such that it is fluid-tight and such that, in a plurality of locations at which the corrugated sheet-metal moulding is in contact with the push-pull plate, fixed connections are provided between them.

A plurality of embodiments are possible for the linear actuator, for example that of a piezo-electrical actuator; in the present case, however, it is an electromagnet arrangement having a stator and a rotor. The rotor may be coupled to the valve element by a geared arrangement or be part of the valve element. Alternatively, the valve element may also be in one piece with the rotor. The bellows arrangement may be linked to the rotor.

In this arrangement, the stator may take the form of a multi-pole stator having a plurality of stator poles which are arranged spaced in a row, the stator having a plurality of exciter coils associated with the respective stator poles and each arranged between two stator poles. In the context of the present invention, the term multi-pole stator is understood to mean an arrangement of two or more pole pins which are cylindrical (for example cylindrical or elliptic-cylindrical) or polygonal (for example three-sided, four-sided or six-sided) in cross-section and which are arranged on a surface, for example a plane, and are surrounded by one or more coil arrangements. Here, a separate coil arrangement may be associated with each pole pin, or a coil arrangement is wound around a plurality of pole pins. This allows a high magnetic force density to be generated, as is shown by the very rapid building up and dissipating of a magnetic field and the highly dynamic valve switching behaviour.

In a similar manner, the armature may take the form of a multi-pole armature whereof the armature poles are aligned with the respective stator poles. Here, the armature poles may be formed by thinner or thicker portions in the armature plate, which elsewhere substantially follows the contour of the end face of all the pole pins, seen as a whole.

The electromagnet arrangement may have an operational air gap, preferably oriented transversely in relation to the direction of movement of the armature, between the stator and the armature. Depending on the spatial conditions, it is however also possible to orient the operational air gap in a different way.

In an embodiment of the invention, the stator and/or the armature of the linear actuator are arranged in the interior of the chamber.

To make flow of the fuel as unhindered as possible, the stator and/or the armature have at least one fluid channel for fluid moving in the direction towards the valve arrangement.

To create particularly narrow or elongate constructions with high holding or closing forces, it is possible to concatenate a plurality of electromagnet arrangements acting on the valve arrangement. Here, the electromagnet arrangements acting on the valve arrangements may either be oriented in the same or opposing directions.

In an embodiment, the linear actuator is provided for the valve means and acts on a movable valve element in order to move the latter between an open position and a closed position in relation to a fixed valve seat which cooperates with the valve element and is arranged down-stream of the fluid inlet. This means that a valve arrangement with direct switching can be created.

The fluid injection valve may take the form of a fuel injection valve arrangement and be set up and dimensioned as such in order to project into the combustion chamber of a spark-ignition internal combustion engine or the combustion chamber of a compression-ignition internal combustion engine.

Further advantages, embodiments or possible variants will become apparent from the description of the figures below, in which the invention is explained in detail.

BRIEF DESCRIPTION OF THE FIGURES

FIGS. 2*a*, 2*b* show a bellows/spring arrangement diagrammatically and in longitudinal section, in accordance with a first embodiment.

FIGS. 3*a*, 3*b* show a bellows/spring arrangement diagrammatically and in longitudinal section, in accordance with a second embodiment.

DETAILED DESCRIPTION OF THE CURRENTLY PREFERRED EMBODIMENTS

Figures 1A, 1B:
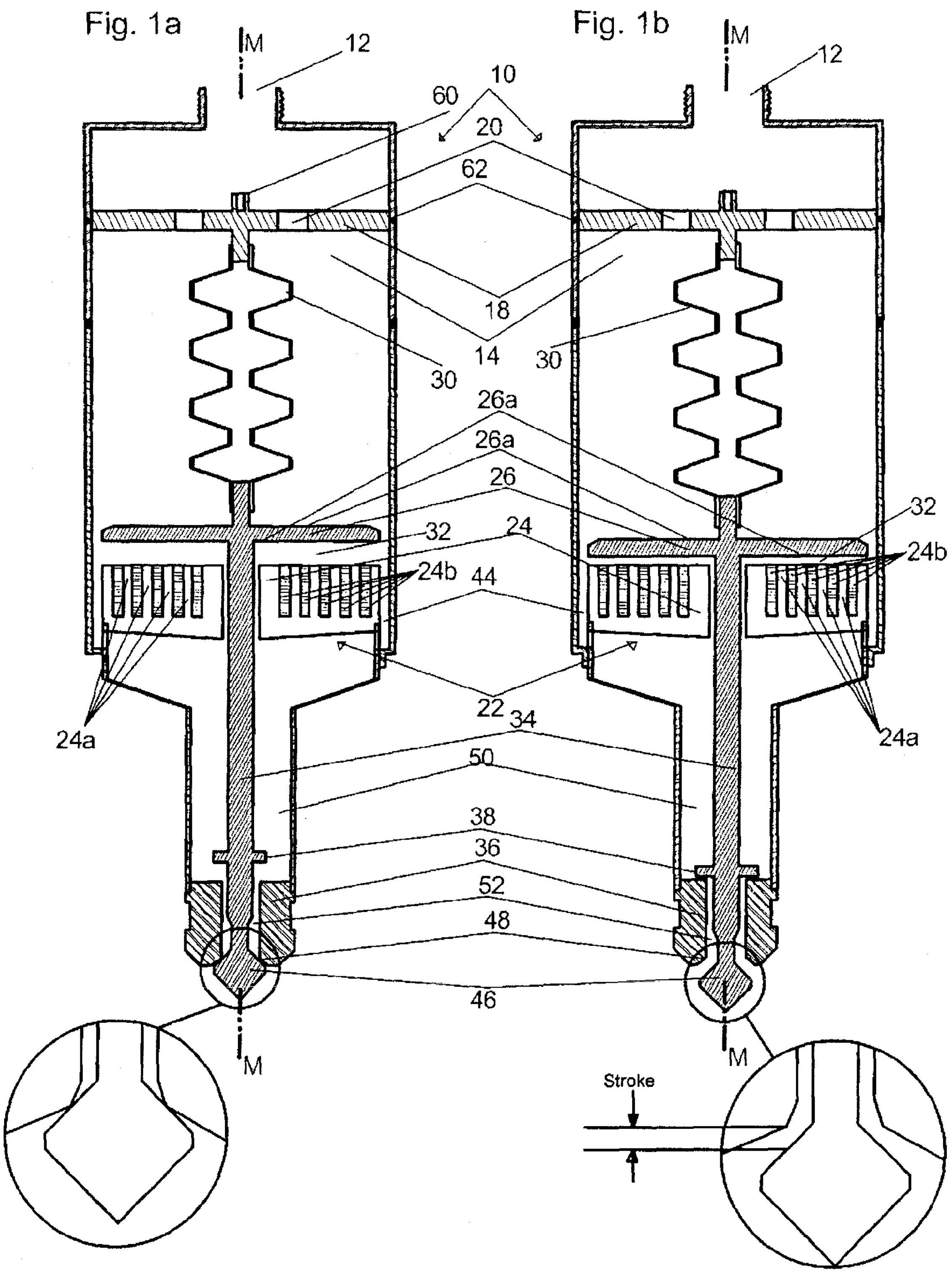
FIG. 1*a* shows a diagrammatic illustration in longitudinal section through a fluid injection valve, according to an embodiment, in the closed position.
FIG. 1*b* shows the fluid injection valve according to FIG. 1*a*, in the open position.

FIG. 1*a* shows, in diagrammatic longitudinal view, a fluid injection valve having a housing 10 which is substantially rotationally symmetrical about a centre longitudinal axis M, in a closed position, whereas FIG. 1*b* shows a fluid injection valve of this kind in an open position. A fluid injection valve of this kind may serve to inject fluid in the form of fuel directly into the combustion chamber (not illustrated in more detail) of an internal combustion engine. The fluid injection valve 10 has (at the top in FIG. 1) a central fluid inlet 12 through which fluid can flow from a fluid distribution line (not illustrated in more detail) to a chamber of the fluid injection valve 10.

The chamber 14 of the fluid injection valve 10 is of a substantially cylindrical form in cross-section and is stiffened in the region near the inlet by a transverse plate 18 having perforations 20. An electromagnet arrangement 22 is arranged remote from the inlet and spaced from the transverse plate 18. The electromagnet arrangement 22 includes a stator 24 which is arranged in the interior of the chamber 14 and is made from soft iron (plates) and is of a substantially cylindrical form in cross-section, and a disc-shaped armature, as the rotor 26, which is also arranged in the interior of the chamber 14 and is substantially cylindrical. The armature or rotor 26 is rigidly connected at its end face 26*a* (the upper face in FIG. 1), by way of a pin, to an end of a spring arrangement 30 which takes the form of a metal bellows. The bellows/spring arrangement 30 is secured at its opposite end (the upper end in FIG. 1), by way of a transverse pin, to the transverse plate 18. The stator 24 in this case takes the form of a multi-pole stator having elongate stator poles 24*a* which are arranged spaced from one another, in a row or concentrically. A plurality of exciter coils 24*b* are associated with the respective stator poles 24*a* in the stator 24 such that they surround them. Similarly, the disc-shaped armature 26 may take the form of a multi-pole armature whereof the armature poles are aligned with the respective stator poles. In this way, the armature 26 may move along the centre longitudinal axis M, with the metal bellows 30 also being set up to expand and contract along this centre longitudinal axis M.

The armature or rotor 26 is rigidly connected at its other end face 26*b* (the lower face in FIG. 1) to a valve needle 34. The valve needle 34 extends through a central opening 36 in the stator 24 and carries at its free end (the lower end in FIG. 1) a valve element 46 which is longitudinally movable along the centre axis M. The valve element 46 is part of a valve arrangement 46, 68 comprising the valve element 46 and a valve seat 48 in order to eject the fluid in controlled manner. The valve seat widens conically in the direction of flow; the valve element 46 is shaped accordingly and cooperates with the valve seat 48. The valve element 46 is moved by the valve needle 34 between an open position and a closed position (up and down in FIG. 1) in relation to the fixed valve seat 48, which cooperates with the valve element 46 and is arranged downstream of the fluid inlet 12. For this purpose, the valve seat is incorporated into a bushing 36 which terminates a connection pipe 50 integrally formed on the chamber 14.

In this arrangement, the armature disc 26, together with the valve needle 34, is loaded by the bellows/spring arrangement 30 that is arranged coaxially in relation to the centre axis M, with the result that the valve element 46 located at the end of the valve needle 34 is seated in fluid-tight manner in the valve seat 48, that is to say forced into its closed position. When current flows through the exciter coils 24*b*, a low-turbulence magnetic field is induced in the stator poles 24*a* and pulls the armature disc 26, together with the valve needle 34, in the direction of the stator 24. This means that the valve element 46 is moved away from the valve seat 48, into its open position. This means that the fluid injection valve 10 ejects fluid coming from the fluid inlet 12 in controlled manner through the valve element 46 and valve seat 48, for example into the combustion chamber of an internal combustion engine. This may be either the combustion chamber of a spark-ignition internal combustion engine or the combustion chamber of a compression-ignition internal combustion engine.

An operational air gap 32 which is oriented transversely to the direction of movement of the armature 26 is formed between the stator 24 and the armature 26. Here, the difference between the minimum and maximum extent of the operational air gap in the direction of the centre longitudinal axis M represents the stroke by which the valve element 46 can be raised away from the valve seat 48.

The multi-pole stator 24 includes an arrangement of a plurality of pole pins 28*a* which are polygonal or cylindrical in cross-section or plan view and are arranged on a surface. These pole pins, which in the present example are rectangular, may also be substantially square or trapezoidal in plan view. They are surrounded by one or more coil arrangements 24*b*. Here, in the present embodiment of the invention, a separate coil arrangement is associated with each pole pin and surrounds it. However, it is also possible for a coil arrangement to be wound around a plurality of pole pins. However, it will be appreciated that the coil arrangements may share the space between two adjacent pole pins.

The multi-pole stator 24 may be formed by a single piece of soft iron out of which the pole pins or interstices are shaped. Cutouts in the form of slits, grooves which run longitudinally as seen in plan view, or slots may be made in a one-piece soft iron moulding of this kind. However, it is also possible for the magnet yoke arrangement to be made as a moulding of sintered iron powder or to be assembled from a plurality of layers of sheet metal or a plurality of separate parts and where appropriate joined by adhesion.

The armature 26 is a circular disc containing soft iron and of a shape described in detail below. The multi-pole stator 24 and the armature 26 overlap in the radial direction in relation to the centre axis M. As shown in FIG. 1, the multi-pole stator 24 has approximately the same external diameter as the armature 26, with the result that the magnetic flux created by the coil arrangements 24*b* can penetrate into the armature 26 in practice with only negligible losses due to scattering. This creates a particularly efficient magnetic circuit which makes very short valve opening and closing times and high holding forces possible.

The armature disc 26 may also be a closed circular disc of soft iron—regardless of the shape of the multi-pole stator 24 or of the coil arrangements 26—provided the construction of the magnet yoke or magnetic coil arrangement ensures that the losses due to scattering or to turbulence are small enough for the respectively intended use. To reduce the weight while optimising the magnetic flux density, the armature takes the form of a multi-pole armature whereof the armature poles are aligned with the respective stator poles. Here, the armature poles are formed by thinner or thicker portions in the armature plate, which elsewhere substantially follows the contour of the end face of all the pole pins, seen as a whole.

The stator 24 is surrounded by an annular gap 44 through which fluid in the chamber 16 may pass from the connection pipe 50 to the valve arrangement 46, 48. The bushing 36 has a central fluid outlet 52 which opens into the valve seat 48 and through which the valve needle 34 having the valve element 46 projects.

The valve needle 34 has at its free end an annular collar 38 which, together with the surface of the bushing 36 lying in the interior of the pipe 50, serves as an abutment and stroke limiter for the valve arrangement 46, 48.

While the embodiment described above represents an outwardly open valve, it is also possible to construct an inwardly open variant on the valve arrangement 46, 48. In order to compensate the force which is generated by the pressurised fluid and which acts on the valve arrangement 46, 48 to close it—as in the outwardly opening embodiment—it is particularly advantageous to mount the bellows/spring arrangement 30, which is cylindrical (in the manner of a circle) in cross-section to have a rest condition with a pre-tension that is adjusted to be approximately half the force which the fluid pumped into the chamber exerts on the valve element as a (closing) force. For this purpose, by means of a screw which is screwed into a screw bushing 60 of the transverse plate 18 that faces the fluid inlet 12, the transverse plate 18 may adjust the axial extent and the force of the bellows/spring arrangement 30 that acts on the armature 26 and hence on the valve element 46. The transverse plate 18 should then be welded in this axial position inside the chamber 14 at 62, for example by means of a laser.

The construction of the bellows/spring arrangement 30 also depends on whether the arrangement selected is formed and dimensioned such that it becomes longer or shorter as the fluid pressure rises, and thus exerts a force corresponding to the fluid pressure on the armature 26 and consequently on the valve element 46.

FIG. 2*a* shows diagrammatically a bellows/spring arrangement 30 which shortens as the fluid pressure P++ rises in relation to a pressure level P in the interior and outside the bellows arrangement 30—see FIG. 2*b*.

By contrast, FIG. 3*a* shows diagrammatically a bellows/spring arrangement 30 which lengthens as the fluid pressure P++ rises in relation to a pressure level P in the interior and outside the bellows arrangement 30—see FIG. 3*b*.

Figures 4A, 4B:
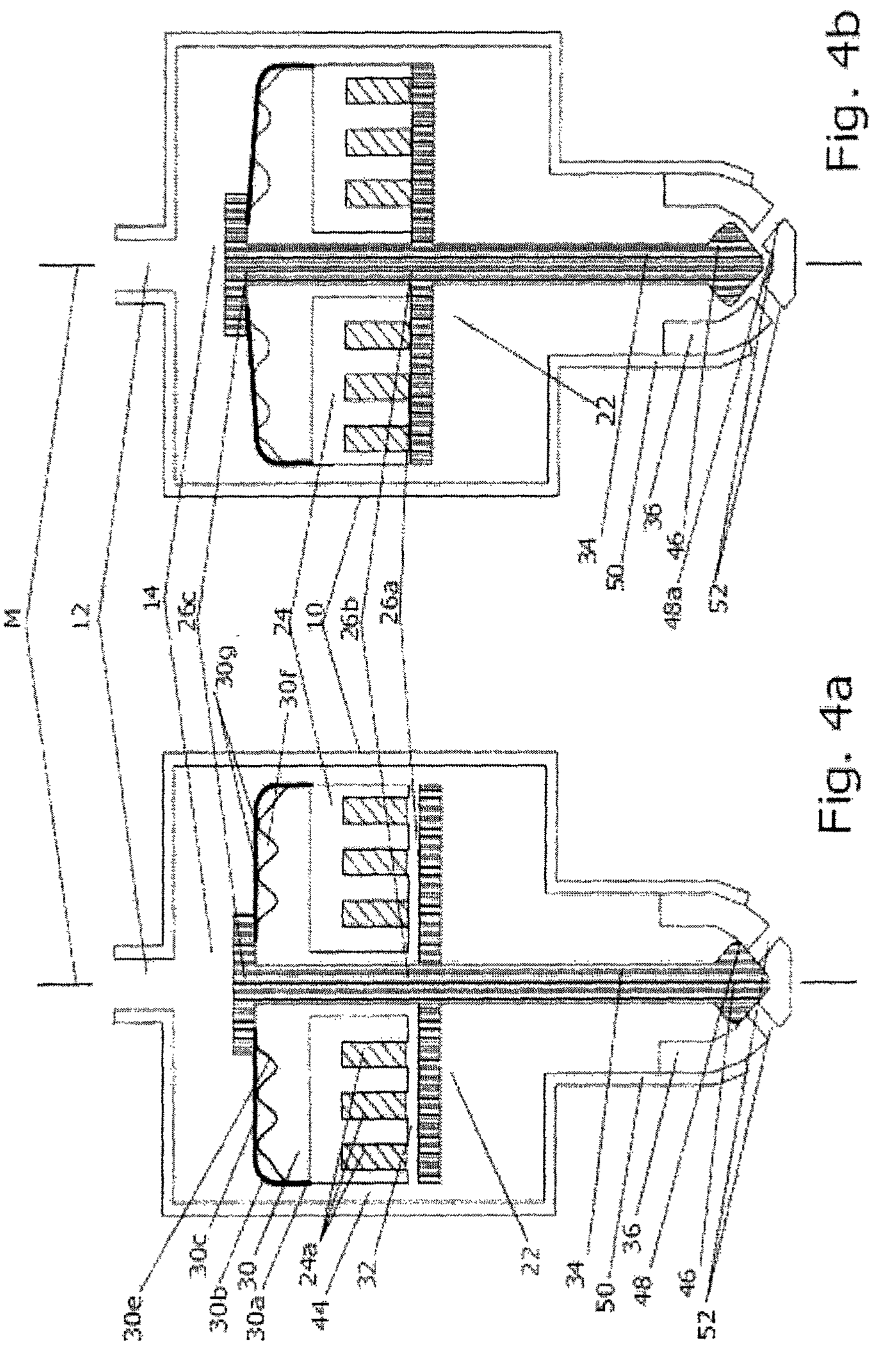
FIGS. 4*a*, 4*b* show a further embodiment of a fluid injection valve, diagrammatically and in longitudinal section, in the closed position of the valve (FIG. 4*a*) and the open position thereof (FIG. 4*b*).

FIG. 4*a* shows, in diagrammatic longitudinal section, a fluid injection valve having a housing 10 which is substantially rotationally symmetrical about a centre longitudinal axis M, in a closed position, whereas FIG. 4*b* shows a fluid injection valve of this kind in an open position. The fluid injection valve 10 has (at the top in FIGS. 4*a*, 4*b*) a central fluid inlet 12 through which fluid can flow from a fluid distribution line—not shown in further detail—to a chamber of the fluid injection valve 10.

The chamber 14 of the fluid injection valve 10 is of a substantially cylindrical form in cross-section. An electromagnet arrangement 22 is arranged remote from the fluid inlet 12. The electromagnet arrangement 22 includes a stator 24 which is arranged in the interior of the chamber 14, is made from soft iron (plates) and is of a substantially cylindrical form in cross-section, and a disc-shaped armature, as the rotor 26, which is also arranged in the interior of the chamber 14 and is substantially cylindrical. The armature or rotor 26 has a pin 26*b* integrally formed on its end face 26*a* (the upper face in FIG. 4), which includes a radially widened annular collar 26*c*.

The spring arrangement 30 is supported against the stator 24 and acts in opposition to the annular collar 26*c* on the pin 26*a* of the armature or rotor 26, which is rigidly connected at its other end face 26*b* (the lower face in FIG. 4) to a valve needle 34.

In this embodiment, the spring arrangement 30 has a cylindrical or conical annular portion 30*a*, which rests on the stator 24 by means of its free edge. On the side remote from the stator 24, the spring arrangement 30 merges by way of an inwardly curved wall portion 30*b* into a planar disc portion 30*c*. This disc portion 30*c* has a central cutout 30*d* and forms a substantially dish-shaped push-pull plate 30*c* which is oriented substantially radially—as seen in the direction of movement of the pin 26*a* of the armature or rotor 26 and the valve needle 34 having the valve element 46. The pin 26*a* of the armature or rotor 26 is received in the central cutout 30*d*, and the push-pull plate 30*c* abuts against the annular collar 26*c* of the pin 26*a*.

A concentrically corrugated sheet-metal moulding 30*e* is arranged fluid-tight on the side of the spring arrangement 30 facing the stator 24, such that the sheet-metal moulding 30*e* and the push-pull plate 30*c* form a pressurised chamber 30*f* which is deformable under pressure. Here, the concentrically corrugated sheet-metal moulding 30*e* is welded by its edges to the push-pull plate 30*c* and the annular portion 30*a*, for example, such that it is fluid-tight. Furthermore, in a plurality of locations 30*g* at which the corrugated sheet-metal moulding 30*e* is in contact with the push-pull plate 30*c*, fixed connections, for example welds, are provided between them. This has the effect that the push-pull plate 30*c* is elastically deformed under the action of fluid pressure prevailing in the chamber 14 such that the force thereof exerted on the valve element 46 (by way of the annular collar 26*c*, the pin 26*a* of the armature or rotor 26 and the valve needle 34) varies with the pressure of the fluid prevailing in the chamber 14. This force acts on the valve needle 34 as the fluid pressure prevailing in the chamber 14 increases such that the valve needle 34 tends to raise the valve element 46 out of the valve seat 48. The stroke distance by which the push-pull plate 30*c* acts on the valve needle 34 is only part of the total stroke of the valve needle 34, and is sufficiently large for the closing force resulting from the fluid pressure in the interior of the chamber 14 to be cancelled once the valve element 46 has been raised out of the valve seat 48.

In the present example, the corrugated sheet-metal moulding 30*e* has two annular corrugations. However, there may be more or fewer of these. The annular corrugations and the push-pull plate 30*c* together form the pressurised chamber 30*f*. Instead of forming the pressurised chamber 30*f* as a circular structure, it is also possible to distribute a plurality of mutually separated chambers over the surface of the push-pull plate 30*c*.

The spring arrangement 30, which has the annular portion 30*a*, the inwardly curved wall portion 30*b* and the planar disc portion 30*c*, is made as a pressed part from a material which has the softness required for bending and tensile strength. The concentrically corrugated sheet-metal moulding 30*e* is also a pressed part.

In this arrangement, the stator 24 takes the form of a multi-pole stator having elongate stator poles 24*a* which are arranged spaced in a row or concentrically. A plurality of exciter coils 24*b* are associated with the respective stator poles 24*a* in the stator 24 such that they surround them. Similarly, the disc-shaped armature 26 may take the form of a multi-pole armature whereof the armature poles are aligned with the respective stator poles. In this way, the armature 26 may move along the centre longitudinal axis M, with the metal bellows 30 also being set up to expand and contract along this centre longitudinal axis M. The valve needle 34 extends through a central opening 36 in the stator 24 and carries at its free end (the lower end in FIG. 4) a valve element 46 which is longitudinally movable along the centre axis M.

The valve element 46 is part of a valve arrangement 46, 48 comprising the valve element 46 and a valve seat 48 in order to eject the fluid in controlled manner. The valve seat 48 takes the form of an inwardly opening valve, with the valve element 46 penetrating into a hollow 48*a* having a plurality of outlet channels 52 in order to close the valve, or projecting therefrom in order to release the outlet channels 52. The valve element 46 is moved by the valve needle 34 between an open position and a closed position (up and down in FIG. 4) in relation to the fixed valve seat 48, which cooperates with the valve element 46 and is arranged downstream of the fluid inlet 12. For this purpose, the valve seat 48 is incorporated into a bushing 36 which terminates a connection pipe 50 integrally formed on the chamber 14.

In this arrangement, the valve needle 34, together with the valve element 46, is loaded by the spring arrangement 30 in the direction of opening when the fluid pressure in the interior of the chamber 14 rises. When current flows through the exciter coils 24*b*, a low-turbulence magnetic field is induced in the stator poles 24*a* and pulls the armature disc 26, together with the valve needle 34, in the direction of the stator 24. The effect of the spring arrangement 30 is that the magnetic force required to raise the valve element 46 out of the valve seat 48—and hence the electrical current required therefor—may be kept at least approximately constant even if the fluid pressure in the interior of the chamber 14 increases or fluctuates.

An operational air gap 32 which is oriented transversely to the direction of movement of the armature 26 is formed between the stator 24 and the armature 26. Here, the difference between the minimum and maximum extent of the operational air gap in the direction of the centre longitudinal axis M represents the stroke by which the valve element 46 can be raised away from the valve seat 48.

The multi-pole stator 24 includes an arrangement of a plurality of pole pins 28*a* which are polygonal or cylindrical in cross-section or plan view and are arranged on a surface. These pole pins, which in the present example are rectangular, may also be substantially square or trapezoidal in plan view. They are surrounded by one or more coil arrangements 24*b*. Here, in the present embodiment of the invention, a separate coil arrangement is associated with each pole pin and surrounds it. However, it is also possible for a coil arrangement to be wound around a plurality of pole pins. However, it will be appreciated that the coil arrangements may share the space between two adjacent pole pins.

The multi-pole stator 24 may be formed by a single piece of soft iron out of which the pole pins or interstices are shaped. Cutouts in the form of slits, grooves which run longitudinally as seen in plan view, or slots may be made in a one-piece soft iron moulding of this kind. However, it is also possible for the magnet yoke arrangement to be made as a moulding of sintered iron powder or to be assembled from a plurality of layers of sheet metal or a plurality of separate parts and where appropriate joined by adhesion.

The armature 26 is a circular disc containing soft iron and of a shape described in detail below. The multi-pole stator 24 and the armature 26 overlap in the radial direction in relation to the centre axis M. As shown in FIG. 1, the multi-pole stator 24 has approximately the same external diameter as the armature 26, with the result that the magnetic flux created by the coil arrangements 24*b* can penetrate into the armature 26 in practice with only negligible losses due to scattering. This creates a particularly efficient magnetic circuit which makes very short valve opening and closing times and high holding forces possible.

The armature disc 26 may also be a closed circular disc of soft iron—regardless of the shape of the multi-pole stator 24 or of the coil arrangements 24*b*—provided the construction of the magnet yoke or magnetic coil arrangement ensures that the losses due to scattering or to turbulence are small enough for the respectively intended use. To reduce the weight while optimising the magnetic flux density, the armature takes the form of a multi-pole armature whereof the armature poles are aligned with the respective stator poles. Here, the armature poles are formed by thinner or thicker portions in the armature plate, which elsewhere substantially follows the contour of the end face of all the pole pins, seen as a whole.

The stator 24 is surrounded by an annular gap 44 through which fluid in the chamber 14 may pass from the connection pipe 50 to the valve arrangement 46, 48. A bushing 36, together with the valve arrangement 46, 48, is arranged in the free end (at the bottom in FIG. 4). The bushing 36 has a plurality of fluid outlets 52 which extend from the valve seat 48 to the outside and which can be closed/released by the valve element 46 arranged on the valve needle 34.

Figure 4C:
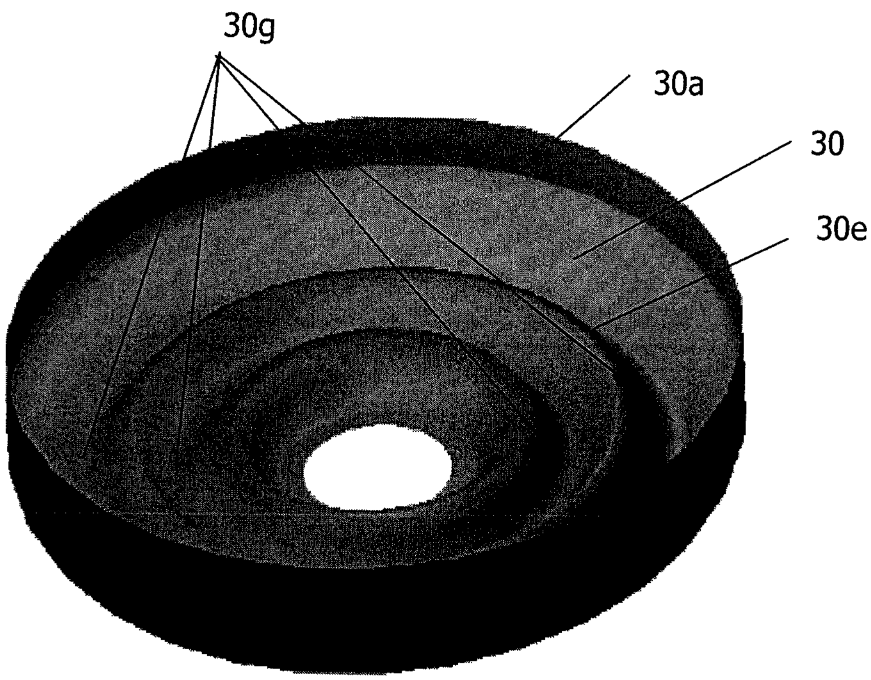
FIG. 4*c* is a diagrammatic perspective view of the spring element from below.

While the embodiment in FIG. 4 shows an inwardly opening valve, it is also possible to construct an outwardly opening variant on the valve arrangement 46, 48. In order to compensate the force which is caused by the pressurised fluid and loads the valve arrangement 46, 48 in the direction of opening—as in the inwardly opening embodiment—the spring arrangement 30 may be assembled to have a rest condition with a pre-tension that may be adjusted to be approximately half the force which acts as a (closing) force on the valve element and is exerted by the fluid pumped into the chamber.

The construction of the spring arrangement 30 also depends on whether the arrangement selected is formed and dimensioned such that it becomes longer or shorter as the fluid pressure rises, and thus exerts a force corresponding to the fluid pressure on the armature 26 and consequently on the valve element 46.

It goes without saying that the embodiments which are detailed in the above description of the invention and the individual aspects thereof may be combined with one another even if combinations of this kind are not detailed above individually. The spatial and structural details and relationships that are shown of the individual components in relation to one another may be adapted to the actual requirements. Moreover, individual dimensions and proportions in the figures have been selected for the better representation of the principles and concepts detailed. In the case of concrete embodiments, it may be that dimensions differing from these are to be selected, without this representing a deviation from what is disclosed and what is defined in the claims.

The invention claimed is:

1. A fluid injection valve having
an inlet which
  is set up to receive fluid from a supply line and
  is connected to a chamber,
a fluid outlet which
  is connected to the chamber,
  is set up to allow fluid to flow out of the fluid injection valve and
  has a valve arrangement having
    a valve seat and
    a valve element, wherein
      the valve element is set up to perform opening and closing movements relative to the valve seat,
a linear actuator which is set up to move the valve element to the valve seat, the linear actuator being an electromagnet arrangement having a stator, and wherein the stator takes the form of a multi-pole stator having a plurality of stator poles which are arranged spaced in a row, the stator having a plurality of exciter coils associated with the respective stator poles and each arranged between two stator poles, and
a spring arrangement which exerts on the valve element a force which is dependent on the fluid pressure prevailing in the chamber, wherein
  the spring arrangement
    includes a push-pull plate which is substantially dish-shaped and is oriented—relative to the direction of movement of the valve element in the radial direction, and
    includes at least one pressurised chamber which is deformable under pressure and is arranged fluid-tight against the dish-shaped push-pull plate such that it deforms the push-pull plate elastically under the action of the pressure prevailing in the chamber, with the result that the force thereof exerted on the valve element varies with the pressure of the fluid prevailing in the chamber.

2. The fluid injection valve according to claim 1, wherein the spring arrangement exerts a force on the valve element that is inversely proportional to the fluid pressure prevailing in the chamber.

3. The fluid injection valve according to claim 1, wherein the spring arrangement exerts a force which
a) acts on the valve element in the direction of closing the valve arrangement if the valve element moves outwards on opening—in relation to the chamber—or
b) acts on the valve element in the direction of opening the valve arrangement if the valve element moves inwards on opening—in relation to the chamber.

4. The fluid injection valve according to claim 1, wherein the spring arrangement has a rest condition with a pre-tension, wherein the pre-tension exerts on the valve element approximately one quarter to three quarters of the force which the fluid pumped into the chamber exerts.

5. The fluid injection valve according to claim 1, wherein the spring arrangement has a cylindrical or conical annular portion, which rests on the stator, and a planar disc portion, which has a central cutout receiving a pin of the armature or rotor.

6. The fluid injection valve according to claim 1, wherein the linear actuator is an electromagnet arrangement having a rotor, the rotor thereof being coupled to the valve element by a geared arrangement or being part of the valve element.

7. The fluid injection valve according to claim 6, wherein the pressurised chamber which is deformable under pressure is formed by the fact that a concentrically corrugated sheet-metal moulding is arranged fluid-tight against the push-pull plate on the side of the spring arrangement facing the stator.

8. The fluid injection valve according claim 7, wherein the concentrically corrugated sheet-metal moulding is connected by its edges to the push-pull plate and the annular portion such that it is fluid-tight and such that, in a plurality of locations at which the corrugated sheet-metal moulding is in contact with the push-pull plate, fixed connections are provided between them.

9. The fluid injection valve according to claim 8, wherein the armature takes the form of a multi-pole armature whereof the armature poles are aligned with the respective stator poles.

10. The fluid injection valve according to claim 1, wherein the linear actuator is arranged at least in part in the interior of the chamber.

11. The fluid injection valve according to claim 1, wherein the stator and/or the armature have at least one fluid channel for fluid moving in the direction towards the valve arrangement.

12. The fluid injection valve according to claim 1, wherein the electromagnet arrangement acts on a movable valve element of the valve arrangement in order to move the valve element between an open position and a closed position in relation to a fixed valve seat which cooperates with the valve element and is arranged downstream of the fluid inlet, and/or wherein the electromagnet arrangement has an operational air gap, preferably oriented transversely in relation to the direction of movement of the armature, between the stator and the armature.

13. The fluid injection valve according to claim 1, wherein a plurality of electromagnet arrangements acting on the valve arrangement are provided.

14. The fluid injection valve according to claim 1, which is set up and dimensioned as a fuel injection valve in order to project into the combustion chamber of a spark-ignition or a compression-ignition internal combustion engine.

* * * * *